(12) United States Patent
Irmer et al.

(10) Patent No.: US 11,349,615 B2
(45) Date of Patent: May 31, 2022

(54) HIGH SPEED COMMUNICATION FOR VEHICLES

(71) Applicant: VODAFONE IP LICENSING LIMITED, Newbury Berkshire (GB)

(72) Inventors: Ralf Irmer, Newbury Berkshire (GB); Prakash Bhat, Newbury Berkshire (GB)

(73) Assignee: VODAFONE IP LICENSING LIMITED, Newbury (GB)

( * ) Notice: Subject to any disclaimer, the term of this patent is extended or adjusted under 35 U.S.C. 154(b) by 56 days.

(21) Appl. No.: 15/031,497

(22) PCT Filed: Oct. 24, 2014

(86) PCT No.: PCT/GB2014/053180
§ 371 (c)(1),
(2) Date: Apr. 22, 2016

(87) PCT Pub. No.: WO2015/059494
PCT Pub. Date: Apr. 30, 2015

(65) Prior Publication Data
US 2016/0241367 A1     Aug. 18, 2016

(30) Foreign Application Priority Data
Oct. 24, 2013 (GB) ..................... 1318818

(51) Int. Cl.
*H04L 5/00* (2006.01)
*H04W 36/32* (2009.01)
(Continued)

(52) U.S. Cl.
CPC ........... *H04L 5/0035* (2013.01); *H04B 7/024* (2013.01); *H04L 5/0069* (2013.01); *H04W 4/029* (2018.02); *H04W 4/50* (2018.02); *H04W 36/0069* (2018.08); *H04W 36/32* (2013.01); *H04W 64/006* (2013.01); *H04L 5/006* (2013.01); *H04L 5/0075* (2013.01); *H04W 4/42* (2018.02)

(58) Field of Classification Search
CPC ....... H04W 4/06; H04W 36/32; H04W 28/26; H04W 16/28; H04W 64/00;
(Continued)

(56) References Cited

U.S. PATENT DOCUMENTS

2006/0068822 A1   3/2006   Kalhan
2006/0111149 A1   5/2006   Chitrapu
(Continued)

FOREIGN PATENT DOCUMENTS

EP   2582192   4/2013

OTHER PUBLICATIONS

International Search Report, PCT/GB2014/053180, dated Aug. 1, 2015.
(Continued)

*Primary Examiner* — Quoc Thai N Vu
(74) *Attorney, Agent, or Firm* — B. Aaron Schulman, Esq.; Stites & Harbison, PLLC

(57) ABSTRACT

A cellular communications network comprises a plurality of geographically distributed access nodes arranged for communication with mobile terminals. A location prediction engine predicts a location for a first mobile terminal at a predetermined time and a configuration output configures two or more of the plurality of access nodes for coordinated communication with the first mobile terminal at the predetermined time, based on the predicted location for the first mobile terminal.

14 Claims, 11 Drawing Sheets

(51) Int. Cl.
*H04W 4/029* (2018.01)
*H04B 7/024* (2017.01)
*H04W 4/50* (2018.01)
*H04W 36/00* (2009.01)
*H04W 64/00* (2009.01)
*H04W 4/42* (2018.01)

(58) Field of Classification Search
CPC . H04W 64/006; H04W 36/245; H04W 88/08; H04W 88/12; H04W 36/00; H04W 36/0055; H04W 36/0083; H04W 36/06; H04W 36/08; H04W 48/20; H04W 64/003; H04W 4/027; H04W 4/42; H04W 24/02; H04W 36/0016; H04W 36/0027; H04W 36/18; H04W 36/28; H04W 36/38; H04W 40/026; H04W 72/048; H04W 76/15; H04W 84/005; H04B 7/0408; H04L 5/0035
See application file for complete search history.

(56) References Cited

U.S. PATENT DOCUMENTS

| | | | |
|---|---|---|---|
| 2008/0181180 A1* | 7/2008 | Karaoguz | H04B 7/0408 370/331 |
| 2010/0099416 A1* | 4/2010 | Kazmi | H04W 36/18 455/442 |
| 2010/0254346 A1 | 10/2010 | Jain et al. | |
| 2011/0143761 A1* | 6/2011 | Uusitalo | H04W 72/02 455/450 |
| 2012/0178468 A1 | 7/2012 | Jeong et al. | |
| 2012/0182935 A1* | 7/2012 | Addepalli | H04W 36/026 370/328 |
| 2013/0329598 A1* | 12/2013 | DiFazio | H04W 64/003 370/254 |
| 2015/0264620 A1* | 9/2015 | Timus | H04W 24/02 455/440 |

OTHER PUBLICATIONS

International Search Report and Written Opinion in International Application No. PCT/GB2014/053180, dated Apr. 26, 2016.
Search Report in corresponding Great Britain Application No. 1318818.0 dated Mar. 11, 2014.
Guibene, et al, "Degrees of Freedom of Downlink Single-and Multi-Cell Multi-User MIMO Systems with Location Based CSIT", Jun. 2-5, 2013, Vehicular Technology Conference (VTC Spring), IEEE 77th.
United Kingdom Examination Report dated Oct. 10, 2019 in corresponding UK Application No. GB1318818.0.

* cited by examiner

HIGH SPEED COMMUNICATION FOR VEHICLES

TECHNICAL FIELD OF THE INVENTION

The present invention concerns a network entity of a cellular communications network that comprises a plurality of geographically distributed access nodes arranged for communication with mobile terminals and a method for configuring such a cellular communications network.

BACKGROUND TO THE INVENTION

Cellular communications networks are being developed to provide service at ever higher data rates. Much of the focus has been on stationary and slow moving mobile terminals. It is well known that, as the velocity of the mobile terminal increases, problems arise in providing high data rate services. At 100 km/hr, 120 km/hr, 150 km/hr, 175 km/hr, 200 km/hr and above, these problems are exacerbated.

In existing cellular communications systems, especially those specified and standardised by the Third Generation Partnership Project (3GPP), such as Long Term Evolution (LTE), a trade-off has been made between the data rate at which the service can be provided and the velocity of the mobile terminal receiving the service. The higher the mobile terminal's velocity, the lower the data rate.

A number of problems exist in providing services to mobile terminals at high velocity. One of these is the well-known Doppler effect. As the mobile terminal moves, there is a shift in the frequency of the signal. At low velocities, this shift can normally be compensated. Compensation can become more difficult when the velocity increases though.

A second problem relates to channel estimation both at the transmitter and the receiver in both uplink and downlink. Channel estimation is used in order to, for example, equalise, synchronise, remove interference in a received signal and any combination of these. Current channel estimation techniques can provide robust channel estimation at low speed, but use for high speed mobile terminals results in a coarse channel estimation. As the mobile terminal moves, the channel changes such that previous channel estimations may no longer be valid and cannot be used in a reliable way. This problem clearly increases as the mobile terminal's velocity gets higher and further limits the data rate that can be provided.

The cellular nature of the network provides a third problem. Each cell is normally designed to service a particular geographical coverage area. When a mobile terminal moves from the coverage area of one cell to another, a handover procedure is required. Where a mobile terminal is travelling at a high velocity, it may pass through the coverage areas of different cells for a relatively short period of time. The frequency of handover can therefore become quite high. This places further strain on the network, increasing overheads and making it more difficult for a high data rate service to be provided.

Another, fourth problem relates to the mechanisms by which signalling is effected in existing cellular communications networks. Data rates can be increased by providing feedback from the mobile terminal to the network. When the mobile terminal is travelling at a high velocity, this feedback may not provide any improvement and indeed, may actually degrade the data rate provided. This is because the feedback may be inaccurate or void of any practical value as it relates to a situation that has changed, due to the movement of the mobile terminal.

A number of practical situations exist where a high data rate service is desirably provided for a mobile terminal moving at a high velocity. The first example relates to racing cars. These can drive at speeds of the order of 360 km/hr (220 mph). Communication to and from the car may include: audio communication with the pit; telemetry (temperatures, pressures or vital information such as tyre wear) and one-way video broadcast from the car to the pit, team and television broadcasting. A car may have over 120 sensors and live telemetry is therefore an important part of the communications in such systems. During an average race, 1.5 Gbyte of data may be gathered from sensors in each car. The typical error-corrected RF-payload is of the order of 2 Mbps in a 2 Mhz spectrum. Currently, the telemetry is transmitted using coded OFDM in the L-band (40 MHz bandwidth) between 1.4 GHz and 1.65 GHz. Telemetries from different cars are frequency multiplexed, to avoid interference and provide a measure of confidentiality between the teams.

Transmitting video adds further problems. The required data rate for high definition video is in the order of 7 to 14 Mbps. OFDM-based technologies can suffer from high Doppler impact, since the shifting and widening of each subcarrier can reduce orthogonality between them and increase inter-carrier interference. Race regulations can require a minimum of five video cameras on-board the car. Currently, those videos delivered using fourth generation (4G) cellular technologies, such as WiMAX or LTE. The typical transmission bit rate may be 5 Mbps per car. If a race has twenty or more cars, the demand placed on the network can be high.

The second example relates to passenger trains. Train customers increasingly expect the provision of high speed data either using a Wireless Local Area Network (WLAN) or using cellular technologies. One technical solution used is to have a local transmitter on a train (either WLAN, cellular or both) and service this transmitter with a high bandwidth back haul link. A typical train may have 600 seats. The possibility of more than one 1000 mobile terminals needing to be serviced across the train is not inconceivable. As a consequence, the back haul link to the train would desirably have a very high data rate.

Existing techniques can provide the desired high data rate in the above examples, although not when the velocity of the mobile terminal is high. One example of this is the Cooperative Multipoint (CoMP) technique that has been defined in 3GPP LTE Release 10 and Release 11. In many cases, the coverage area of two adjacent cells overlaps. When a mobile terminal is located in this overlapping region, it is typically assigned to the cell with the strongest signal. More than one mobile terminal can also be located in this overlapping area and regularly, the two mobile terminals are serviced by different cells. However, the access nodes (base station, cell transmitter, eNodeB or similar) of both cells will normally receive the uplink transmitted signal from both mobile terminals. This can mean that the uplink transmissions from the two mobile terminals will cause interference towards one another. However, CoMP is able to cancel this interference by sending feedback from each cell to the other about the signal transmitted by the user serviced by that cell. The other cell can then use the feedback signal together with an estimation of the channel to cancel the interference. An evaluation of CoMP in 3GPP Technical Report (TR) 36.819 was for 3GPP "case 1" at a speed of 3 km/hr (as defined in 3GPP TR 36.913). Its use when the mobile terminal is travelling at a high velocity is not envisaged, partly because the requirement for feedback cannot readily be met. Similarly MIMO techniques have also been used to achieve higher data rates within a single cell. At high mobile velocities, the channel estimation requirements to use MIMO are problematic.

"A CoMP soft handover scheme for LTE systems in high speed railway", Luo et al, EURASIP Journal on Wireless Communications and Networking 2012:196 discusses a scheme using an dual-antenna system on a train-based mobile terminal for an LTE network in conjunction with CoMP. The use of two antennas allows improved handover, since the antenna at the rear of the train can benefit from the experience of the antenna at the front and thereby result in faster handover. In combination with CoMP in regions where cell coverage overlaps, the likelihood of coverage being lost at cell boundaries is reduced. The focus of this approach is therefore on reducing the call outage probability, but no consideration is made regarding the data rate provided over the cellular network, particularly outside the cell boundaries.

In view of the above, meeting the demand for high data rates when the mobile terminal is at high velocity is a significant challenge.

SUMMARY OF THE INVENTION

Against this background, in a first aspect, the present invention provides a network entity of a cellular communications network. The cellular communications network comprises a plurality of geographically distributed access nodes arranged for communication with mobile terminals. The network entity comprises: a location prediction engine, configured to predict a location for a first mobile terminal at a predetermined time; and a configuration output, arranged to configure two or more of the plurality of access nodes for coordinated communication with the first mobile terminal at the predetermined time, based on the predicted location for the first mobile terminal.

The use of a predicted location for the mobile terminal in order to configure a single access node for communication with the mobile terminal is known. For example, EP-2 555 569 A1 and US-2013/0005374 use a predicted location for the mobile terminal to provide cross-layer optimisation, more efficient resource allocation and improved data rate. Location prediction is especially useful with regard to moving (that is, non-stationary) mobile terminals, such as vehicles. The predicted location may be based on an indication of location and/or movement data for the first mobile terminal, as will be detailed below. As discussed above, coordinated (such as cooperative) communication using multiple access nodes is also known for static or low-speed mobile terminals. It has now been recognised that the combination of these two techniques provides a synergy that significantly improves the data rate that can be achieved for mobile terminals travelling at high velocities.

By predicting a location for the mobile terminal, many of the problems for servicing high velocity mobile terminals using coordinated or cooperative transmission between multiple access nodes are mitigated. Location predication can assist in one or more of: estimating the channel using historical data; selection of suitable access nodes; appropriate resource allocation between access nodes; and many further benefits as discussed herein. The invention may be applied to a second mobile terminal (or further mobile terminals) in the same way as to the first mobile terminal or with possible improvements by sharing information between the mobile terminals.

The term access node is intended to encompass a base station, cell transmitter, NodeB, eNodeB, an access point or similar technology. A cellular communications network can encompass any of those standardised and specified by 3GPP or similar bodies, wireless LAN technologies, WiMAX or other wireless access technology.

Location data may comprise position, altitude, distance from a known point or other similar information, such as provided by global positioning technology (such as GPS, GLONASS or GALILEO or a combination of these) or similar location positioning technologies based on long-range or short-range systems (for example, short-range location identification using Bluetooth or similar). Movement data may comprise speed, velocity, direction or other characteristics of motion. In an embodiment, the location prediction engine may use data based on one or more of: a global positioning technology (as discussed above); an accelerometer; and a compass. These sensors are used commonly in mobile telephones but not yet in modems. Combinations of these technologies may allow location and movement prediction with higher accuracy.

Thus, the present invention may provide, in an aspect related to the first aspect, a mobile terminal of a cellular communications network. The cellular communications network comprises a plurality of geographically distributed access nodes arranged for communication with mobile terminals. The mobile terminal comprises: a first modem, for communicating with the cellular communications network; a second modem, for communicating with a local area network; a location identification engine, configured to identify a location for the mobile terminal and comprising one or more of: a global positioning technology; an accelerometer; and a compass. The mobile terminal may be configured to communicate the identified location to the cellular communications network through the first modem and a network entity of the cellular communications network may use the identified location to predict a future location for the mobile terminal. The combination of the first modem and the second modem may provide a gateway between the cellular communications network and the local area network, especially for Internet Protocol traffic.

In a further embodiment of the location prediction engine, processes of adaptive learning, neural networks or both may be used to predict a location based on a previous location or other historic data. For example, trains or cars may travel multiple times along the same track and based on this, a probability of a location can be calculated from a previous location, for instance using the theory of Markov Chains (Markov model). The Markov model may be trained based on data from previous times, such as days or weeks. Additionally or alternatively, the predicted location may therefore be based on analytic data, which may comprise timetabling information, data about recent journeys (for example, information about delays in the last days or weeks or other similar data). In some embodiments, the predicted location may be based on an indicator parameter, for example, the time. This may be possible when the location is intended to match a timetable or predictable by analytics. Historic data may be used alone or in combination with current data, as discussed above.

In one embodiment, the network entity further comprises selection logic, configured to select two or more of the plurality of access nodes, based on the predicted location for the first mobile terminal. Then, the configuration output is preferably arranged to configure the selected two or more access nodes for coordinated communication with the first mobile terminal. By selecting the access nodes based on the location, advantages can be gained in determining the best set of access nodes to use for service, thereby mitigating handover delays, making channel estimation more straightforward and avoiding the need for feedback. Existing Cooperative Multipoint (CoMP) technologies are particularly reliant on these issues.

Embodiments are also envisaged wherein the network entity further comprises a resource allocation coordinator. This may be configured to determine resource allocation of the two or more access nodes for coordinated communication with the first mobile terminal at the predetermined time, based on the predicted location for the first mobile terminal. Advantageously, the configuration output is arranged to configure the determined resource allocation of the two or more access nodes. Resource allocation can cover a wide variety of issues, including transmission resources, reception resources and other access node or channel resources. For example, the resource allocation determined for the two or more access nodes may comprise one or more of: a bandwidth allocation; transmission power allocation; a duty cycle allocation; and a power supply allocation.

Beneficially, the resource allocation may be designed to split the resources at each access node between multiple mobile terminals. For example, the location prediction engine may be further configured to predict the location for a second mobile at the predetermined time and this may optionally be based on location and/or movement data for the second mobile terminal. The resource allocation coordinator may then be further configured to determine resource allocation of the two or more access nodes for coordinated communication with the first mobile terminal and with the second mobile terminal at the predetermined time. This may then be based on the predicted location for the first mobile terminal and the predicted location for the second mobile terminal. The resources of the two or more access nodes may be limited and consequently may need to be divided between the two mobile terminals. Their location can be used in order to effect an improved allocation.

Additionally or alternatively, the resource allocation coordinator may be further configured to establish activation characteristics for the plurality of access nodes, based on the predicted location for the first mobile terminal. Then, the configuration output may be arranged to activate and/or deactivate at least part of the two or more access nodes based on the established activation characteristics. This may be used to reduce energy consumption. For example, it may be understood that certain access nodes receive very little traffic. By predicting the location of the mobile terminal, an access node can be activated prior to its use by the mobile terminal, based on the mobile terminal's predicted location. Similarly, when the mobile terminal is predicted to be outside the coverage area of an access node it may be deactivated. Both of these approaches can be used together to activate and deactivate access nodes according to their need. Only a part of the access node may be activated and/or deactivated. For example, the physical layer components of the access node can be activated and/or deactivated (such as the transmitter, receiver and/or baseband processing), or the media access control (MAC) layer can be activated and/or deactivated. Together, the Radio Access Network (RAN) of the access node can be activated and/or deactivated. In some cases, a part of the access node, such as a processor or back haul links may remain active.

Another possible benefit of the present invention relates to the directivity of antennas. The network entity may further comprise antenna control logic, configured to determine antenna beam steering configurations of the two or more access nodes for coordinated communication with the first mobile terminal at the predetermined time, based on the predicted location for the first mobile terminal. The configuration output may then be arranged to set the determined antenna beam in configurations of the two or more access nodes. With a prediction for the mobile terminal's location, the access nodes can configure their antennas to provide directivity, enhancing reception of the mobile terminal's signal, improving the transmission efficiency to the mobile terminal or both. Coordinated communication by the access nodes improves the data rate provided for service between the access nodes and the mobile terminal.

In particular embodiments, the configuration outputs may be further arranged to configure MIMO parameters for the two or more access nodes for coordinated communication with the first mobile terminal at the predetermined time, based on the predicted location for the first mobile terminal. The combination of the coordinated communication with MIMO may yield further benefits. Typically, MIMO operates using multiple antennas on the same cell, whereas CoMP works over two or more cells. MIMO operation does not normally imply co-operation of cells.

In some embodiments, the first mobile terminal comprises a plurality of communication systems. These communication systems may be independent, although they may be jointly controlled or jointly operated. The data outputs from the multiple communication systems may be combined or otherwise distributed between a common set of users. In such systems, the configuration output may be arranged to configure the two or more access nodes for coordinated communication with each of the communication systems of the first mobile terminal at the predetermined time, based on the predicted location for the first mobile terminal. For example, the communications systems of the first mobile terminal may be serviced by different access nodes or they may be serviced by the same access node. The configuration of the access nodes can be set to improve the aggregate data rate provided to all of the plurality of communication systems. Preferably, the configuration output is further arranged to configure a first of the two or more access nodes for communication with a first communication system of the first mobile terminal and to configure a second of the two or more access nodes for communication with a second communication system of the first mobile terminal. The communication with the first and second communication systems may then be coordinated. This provides particular benefits, because the communications systems of the first mobile terminal may be able to provide feedback to each other regarding the signals transmitted, received or both with the respective access node. This may further improve the coordinated (or cooperative) communication.

The location prediction engine may function in a variety of ways. For example, it may be configured to predict a location for the first mobile terminal at the predetermined time based on one or more of: a location for the first mobile terminal at a time for the predetermined time; a speed for the first mobile terminal at the time before the predetermined time; and a direction for the first mobile terminal at the time before the predetermined time. This data can be obtained for example, using positioning technology (as discussed above), using an indirect position determination, by knowledge of cell-site, analysis of transmissions received from the mobile terminal or other techniques known the skilled person. With knowledge of the mobile terminal's location and velocity, a prediction may be made regarding its location at a future time. For example, assumptions may be made about the change in velocity. Such a technique is particularly applicable (although not exclusively so) in certain circumstances. For example, the location prediction engine may be configured to predict a location for the first mobile terminal at the predetermined time, based on a predetermined travel route for the first mobile terminal. This can apply to certain types of vehicle, such as trains, racing cars, buses on a fixed route, trams and other types of vehicle that follow a known travel route.

The cellular communications network advantageously comprises one or more of: a Wireless Local Area Network (LAN); a wireless Wide Area Network (WAN); and a mobile telecommunications network (using GSM, UMTS, LTE, WiMAX or other radio access technology).

In a second aspect, there is provided a method for configuring a cellular communications network, comprising a plurality of geographically distributed access nodes arranged for communication with the mobile terminals. The method comprises: predicting a location for a first mobile terminal at a predetermined time (optionally based on location and/or movement data for the first mobile terminal); and configuring two or more of the plurality of access nodes for coordinated communication with the first mobile terminal at the predetermined time, based on the predicted location for the first mobile terminal. It will be recognised that the method of this second aspect may comprise steps corresponding with the features described herein with respect to the network entity. In a yet further aspect, there may be provided a computer program, arranged to carry out the method of the second aspect when operated by a processor. Logic, a processor or other programmable device configured to carry out the method of the second aspect is also provided.

It will also be understood that any combination of features from a specific aspect or between aspects may also be provided, even if that combination is not explicitly disclosed herein.

Ancillary to the present invention (but which may be, either in full or part, used in conjunction or together with aspects of the invention described above) are also now outlined. In a first ancillary aspect, there is provided a method for configuring a cellular communications network. The cellular communications network comprises a plurality of geographically distributed access nodes arranged for communication with a mobile terminal. The mobile terminal comprises a plurality of jointly-operated communications systems. The method comprises configuring the mobile terminal and/or at least one of the plurality of access nodes for communication between the at least one of the plurality of access nodes and each of the plurality of jointly-operated communications systems of the mobile terminal using a respective wireless link, so as to control an aggregate data rate across the plurality of wireless links.

The use of jointly-controlled communications systems and the control of these communications systems, the at least one access node or both in order to adjust the combined data rate between the at least one access node and each of the communications systems marks a change in direction from the prior art. The prior art was concerned with one aspect of the problem identified above, specifically handover. However, the ancillary aspect recognises that, for vehicles moving at high velocity, it is not only desirable to avoid outage, but a consistent, high service data rate is also of great significance. Jointly controlling the communications systems can result in an improved aggregate data rate and not just reduced outage probability. Indeed, a control strategy that is based on outage probability will lead to a different outcome than one based on aggregate data rate. Whilst the ancillary aspects are discussed with reference to two jointly-operated communications systems, the mobile terminal may use more than two jointly-operated communications systems and the ancillary aspect may be extended accordingly.

Jointly-operated communications systems may be one or more of: commonly controlled; providing a single combined data output; the communications systems' data input is received from a common source. Moreover, the data transmitted by each communications system may be different. Each communications system may comprise a respective separate transceiver.

In some embodiments, the communications systems of the mobile terminal and the at least one of the plurality of access nodes are configured for coordinated (or cooperative) communication. Additionally or alternatively, the communications systems of the mobile terminal may be configured for communication with more than one of the plurality of access nodes.

A number of different approaches may be taken for control of the communications systems, access node (or nodes) or both in order to control the aggregate data rate. These approaches need not be mutually exclusive. Indeed, it is envisaged that combinations of these approach could result in further benefits, which may be synergistic.

A first approach relates to control of handover. In such embodiments, the step of configuring the mobile terminal and/or at least one of the plurality of access nodes comprises: determining that a first communications system of the mobile terminal, being serviced by a first access node, has identified a second access node as preferred for handover. Then, the method may further comprise establishing that a second communications system of the mobile terminal is serviced by the second access node, in response to determining that the first communications system has identified the second access node as preferred for handover. As a result, the method may further comprise configuring at least one of: the first communications system of the mobile terminal; the first access node; and the second access node, such that the first communications system of the mobile terminal does not handover to the second access node, in response to establishing that the second communications system of the mobile terminal is serviced by the second access node. In other words, the system may be configured such that two communications systems are not serviced by the same access node at the same time. This may result in increased throughput due to one or more of: lower mutual interference; avoiding the communications systems sharing the capacity of a single access node; and the possibility for joint optimisation, for example by mutual resource allocation, cooperative communication or both.

In particular, the step of configuring the mobile terminal and/or at least one of the plurality of access nodes may further comprise checking that the first communications system can maintain service from the first access node, in response to establishing that the second communications system of the mobile terminal is serviced by the second access node. Then, the step of configuring at least one of: the first communications system of the mobile terminal; the first access node; and the second access node may be carried out such that the first communications system of the mobile terminal continues to be serviced by the first access node, if the first communications system can maintain service from the first access node. Thus, this approach may result in the first communications system maintaining service with the first access node, even if the likelihood of outage would be reduced by its handover to the second access node. Nevertheless, this approach can result in an increased aggregate data rate.

A second approach may use a predicted location to increase throughput. In these embodiments, the method may further comprise predicting a location for each of the plurality of communications systems at a predetermined time (optionally based on a respective location and/or movement data for each communications system). Then, the step of configuring the mobile terminal and/or at least one of the plurality of access nodes may be carried out based on the location predicted for each of the plurality of communications systems. Some further ancillary aspects of this approach will be discussed below.

In a third approach, the communications systems may be designated for different roles. For example, the step of configuring the mobile terminal and/or at least one of the plurality of access nodes may comprise: configuring a first wireless link between a first communications system of the mobile terminal and a first access node to provide an uplink service only for the mobile terminal; and/or configuring a second wireless link between a second communications system of the mobile terminal and a second access node to provide a downlink service only for the mobile terminal. Thus, the different communications systems are designated for one-way traffic only. Advantageously, the first and second access nodes are a single access node. More preferably, the first and second wireless links use a Time Division Duplex (TDD) transmission scheme, most preferably using the same wireless channel (that is, frequency spectrum bandwidth).

A fourth approach jointly optimises the wireless links between each of the communications systems and the at least one access node. In some embodiments, a first communications system of the mobile terminal has a first wireless link with a first access node and a second communications system of the mobile terminal has a second wireless link with a second access node. Then, the first and second wireless links may be susceptible to mutual interference. The step of configuring the mobile terminal and/or at least one of the plurality of access nodes may comprise jointly determining a first transmission parameter for the first wireless link and a second transmission parameter for the second wireless link, on the basis of the aggregate data rate over the first and second wireless links. Then, this step may further comprise assigning the determined first transmission parameter to the first wireless link and the second transmission parameter to the second wireless link. Advantageously, the first and second access nodes are a single access node.

Optionally, the method further comprises predicting a location for each of the first and second communications systems at a predetermined time (for example, based on location and/or movement data for the first and second communications systems). Then, the step of jointly determining a first transmission parameter for the first wireless link and a second transmission parameter for the second wireless link may be made on the basis of the aggregate data rate over the first and second wireless links and on the basis of the location predicted for each of the first and second communications systems.

A second ancillary aspect shares many of the features of the fourth approach. In this aspect, there is also provided a method for configuring a cellular communications network. The cellular communications network comprises at least one access node arranged for communication with a plurality of communications systems. The method comprises: determining that a first communications system and a second communications system are being serviced by a single access node over respective wireless links; predicting a location for each of the first and second communications systems at a predetermined time (for instance, based on location and/or movement data for the first and second communications systems); jointly determining a first transmission parameter for the first wireless link and a second transmission parameter for the second wireless link, on the basis of (or so as to control) the aggregate data rate over the first and second wireless links and on the basis of the location predicted for each of the first and second communications systems; and assigning the determined first transmission parameter to the first wireless link and the second transmission parameter to the second wireless link.

Thus, this ancillary aspect jointly optimises the wireless links for multiple communications systems of the same mobile terminal using the same access node. This is done in order to improve the aggregate data rate using location prediction. The communication between the access node and the multiple communications systems may be coordinate and/or cooperative or it may independent.

A number of features can optionally be included with respect to the fourth approach or the second ancillary aspect. These will now be discussed below.

In particular, the first and second transmission parameters may relate to the same characteristic. Control of the aggregate data rate or jointly determining transmission parameters based on the aggregate data rate may be effected in order to maximise the aggregate data rate over the first and second wireless links. In embodiments, the first and second wireless links may both be an uplink or both be a downlink.

The transmission parameters may relate to one or more different aspects of the wireless link. A first example concerns transmission scheduling. In embodiments, the step of configuring the mobile terminal and/or at least one of the plurality of access nodes further comprises determining that the first and second communications systems are being serviced by the single access node. Then, the step of jointly determining the first and second transmission parameters may comprise identifying a strategy for jointly scheduling transmissions over the first wireless link and over the second wireless link. By scheduling the transmissions together, the use of the access node's resources may be improved and made more efficient.

A second example of such transmission parameters relates to power, such that a power control mechanism may be employed. For example, the first transmission parameter may be a transmission power for the first wireless link. Additionally or alternatively, the second transmission parameter may be a transmission power for the second wireless link.

The step of jointly determining the first and second transmission parameters may be carried out in a variety of ways. For example, this may be carried out on the basis of respective link qualities for each wireless link. One such way comprises: establishing a first link quality for the first wireless link and a second link quality for the second wireless link. The link quality may comprise, be based on or be a function of one or more of: a Signal-to-Noise Ratio (SNR); a Signal-to-Interference Ratio (SIR); a Signal-to-Noise plus Interference Ratio (SNIR); a signal strength; a channel characteristic (such as a path loss); and any similar quality measurement. The method may further comprise: computing a combined link quality for the first and second wireless links; and determining the first and second transmission parameters on the basis of the computed combined link quality. In other words, a combination of the link quality for each wireless link may be used.

For example, the first and second link quality may each be a function of an SNR. The combined link quality may be calculated in a variety of ways. Preferably, the combined link quality comprises a logarithmic sum (such as a sum of the link qualities expressed in dB), which may be equivalent to a multiplication of the link qualities expressed in a linear (non-logarithmic) way.

This approach may be especially advantageous when the transmission parameters are transmission powers. For example, the first and second transmission powers may be determined by identifying two transmission powers that maximise the combined data rate on the basis of the computed combined link quality. These transmission powers may be identified on the basis of a calculation, a look-up table or other determination mechanism. A set (which for two communications systems may have two members) of transmission powers may be determined, but without identifying which communications system, each transmission power should be assigned. Then, the method may further comprise: assigning the higher of the two transmission powers to the link with the higher link quality and the lower of the two transmission powers to the link with the lower link quality. Other assignment schemes may be possible (especially where there are more than two communications systems being used), for example by ranking the communications systems according to their link quality and the transmission powers according to their magnitude, with the communications system with the highest link quality being assigned the highest transmission power and then proceeding in order until the communications system with the lowest link quality is assigned the lowest transmission power.

Some further features may be applicable to all of the ancillary aspects and approaches. These will now be detailed. For example, the plurality of communications systems may comprise: a first communications system located at a first location on a vehicle; and a second communications system located at a second location on a vehicle, the first and second locations being spatially separated. This may be especially useful for trains, trams and other long track-based vehicles, but many also be applied to buses, cars and other smaller vehicles. In some embodiments, the first and second locations are spatially separated by at least 1 m, 1.5 m, 2 m, 5 m, 10 m, 20 m, 50 m, 100 m, 200 m, 300 m, 400 m or 500 m.

In preferred embodiments, the cellular communications network comprises one or more of: a wireless Local Area Network (LAN); a wireless Wide Area Network (WAN); and a mobile telecommunications network (which may use GSM, UMTS, LTE, WiMAX or other Radio Access Technology).

Other ancillary aspects may be found in apparatus or equipment that may implement similar or the same features as discussed herein with reference to the ancillary method.

For example, another ancillary aspect may provide a network entity for configuring a cellular communications network. The cellular communications network comprises a plurality of geographically distributed access nodes arranged for communication with a mobile terminal. The mobile terminal comprises a plurality of jointly-operated communications systems. Then, the network entity may comprises: a configuration system, arranged to configure the mobile terminal and/or at least one of the plurality of access nodes for communication between the at least one of the plurality of access nodes and the plurality of jointly-operated communications systems of the mobile terminal so as to control an aggregate data rate across the plurality of wireless links. Additionally or alternatively, the network entity may comprise: a network analyser, configured to determine that a first communications system and a second communications system are being serviced by a single access node over respective wireless links; a location predictor, arranged to predict a location for each of the first and second communications systems at a predetermined time (for example, based on location and/or movement data for the first and second communications systems); configuration logic configured to jointly determine a first transmission parameter for the first wireless link and a second transmission parameter for the second wireless link, on the basis of (or so as to control) the aggregate data rate over the first and second wireless links and on the basis of the location predicted for each of the first and second communications systems; and an assignment output, arranged to assign the determined first transmission parameter to the first wireless link and the second transmission parameter to the second wireless link.

This network entity may be a dedicated network entity within the Radio Access Network (RAN) or Core Network (CN) of the cellular communications network.

In a further example, an ancillary aspect may be found in a mobile terminal for operation with a cellular communications network, the cellular communications network comprising a plurality of geographically distributed access nodes, the mobile terminal comprising: a plurality of jointly-operated communications systems configured for communication with at least one of the plurality of access nodes so as to control an aggregate data rate across the plurality of wireless links.

BRIEF DESCRIPTION OF THE DRAWINGS

The invention may be put into practice in various ways, one of which will now be described by way of example only and with reference to the accompanying drawings in which.

DETAILED DESCRIPTION OF PREFERRED EMBODIMENTS

Preferred embodiments will now be discussed, primarily with reference to a mobile terminal provided on a train.

However, it will be appreciated that this is only an example mobile terminal. An embodiment using a racing car vehicle will also be outlined briefly below as a further example, but mobile terminals for other kinds of vehicles may also be considered, together with appropriate configuration at the network including the access nodes.

Train Mobile Terminal Design

Figure 1:
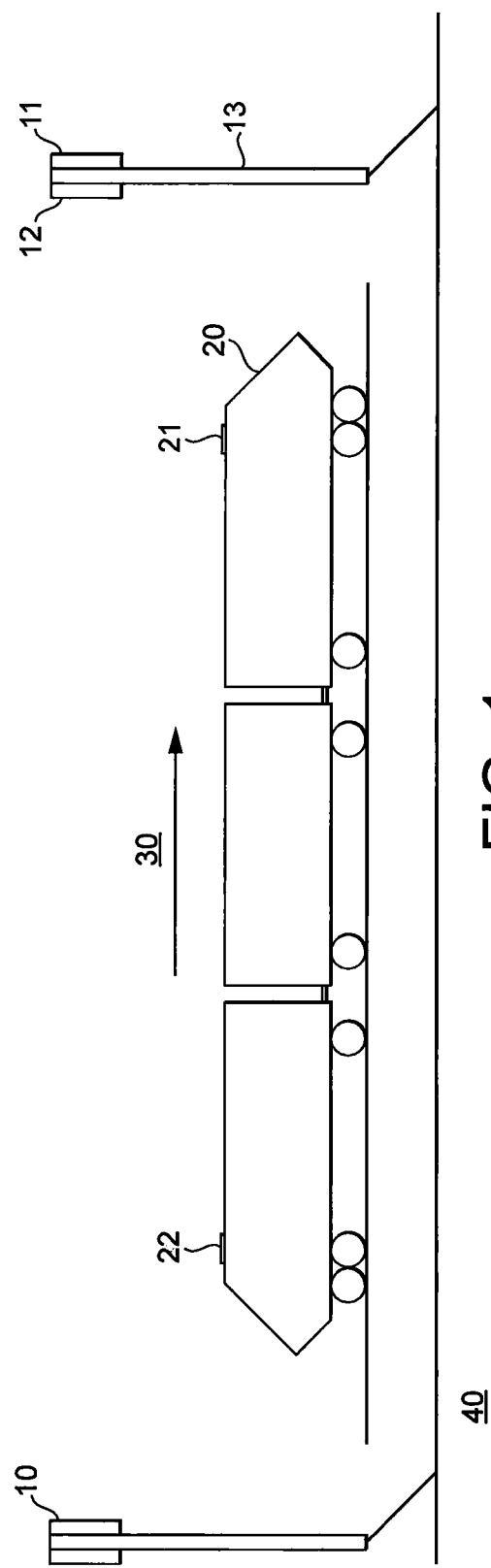
FIG. 1 shows a schematic diagram of a system in accordance with a first embodiment of the invention.

Referring first to FIG. 1, there is shown a schematic diagram of a system in accordance with a first embodiment of the invention. This embodiment relates to a train service. There is provided: antenna masts 10; a train 20, travelling along direction 30; and backhaul interconnects 40. The antenna masts 10 comprise: a forward facing sector antenna 11; a rear facing sector antenna 12; and a mast 13. Each sector antenna is coupled to a separate, respective access point. The sector antennas are directional and the rear facing sector antenna 12 points in the opposite direction along the railway track from the front facing antenna 11. The backhaul interface 40 is preferably a fibre optic cable that follows the course of the railway.

The train 20 has a front modem and antenna 21 (a first communications system) and a rear modem and antenna 22 (a second communications system). The first and second communications systems have a common controller and are considered a single mobile terminal. More than two communications systems can be provided, with common control.

This embodiment may be used to provide wireless backhaul for in-train Wireless LAN services. This is provided by aggregating the capacity available from the existing terrestrial networks, which may currently be supplemented by satellite backhaul when no cellular connection is available. The multiple communication systems may each attach to a respective access node, which may be the same or different. For longer trains especially, antennas and modems located at either end of the train can support independent active links to separate access nodes (access points). The capacity of the links can then be aggregated to increase the throughput available when compared to a single link.

The communication with multiple access nodes will be discussed firstly. Then, further consideration will be given to the way that the multiple communications systems can be configured to achieve improved aggregated throughput.

Cooperative Strategies for Multiple Access Nodes

Figure 2:
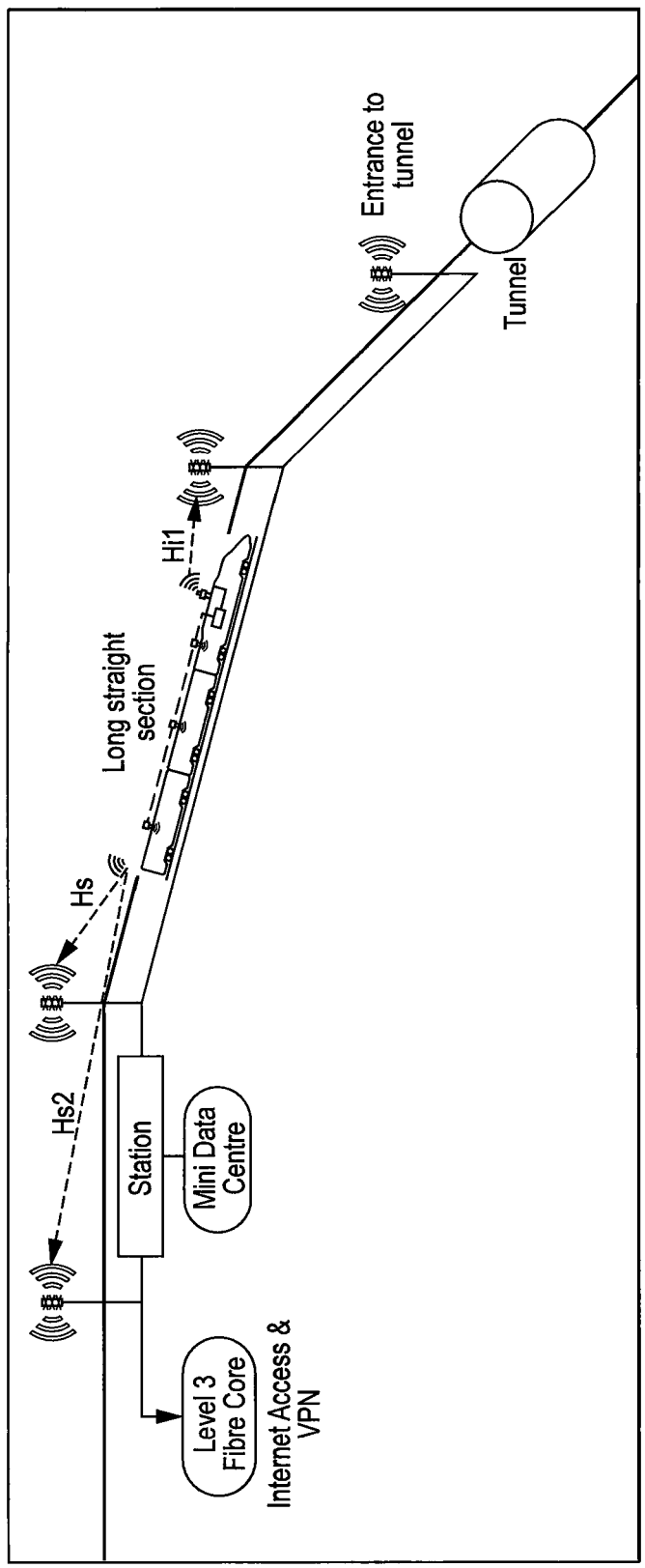
FIG. 2 depicts a schematic diagram relating to the embodiment of FIG. 1 in a first use.

Referring next to FIG. 2, there is depicted a schematic diagram relating to the embodiment for FIG. 1 in a first use. In the first use, it is intended that the train modems will communicate with multiple access nodes using a coordinated or cooperative scheme, such as Cooperative Multi-Point (CoMP) technology. Along the long straight section of track, the front modem can communicate with a rear facing sector via a first link Hi1. The rear facing modem of the train can communicate with one or both of two access points via a second link Hs and a third link Hs2.

Figure 3:
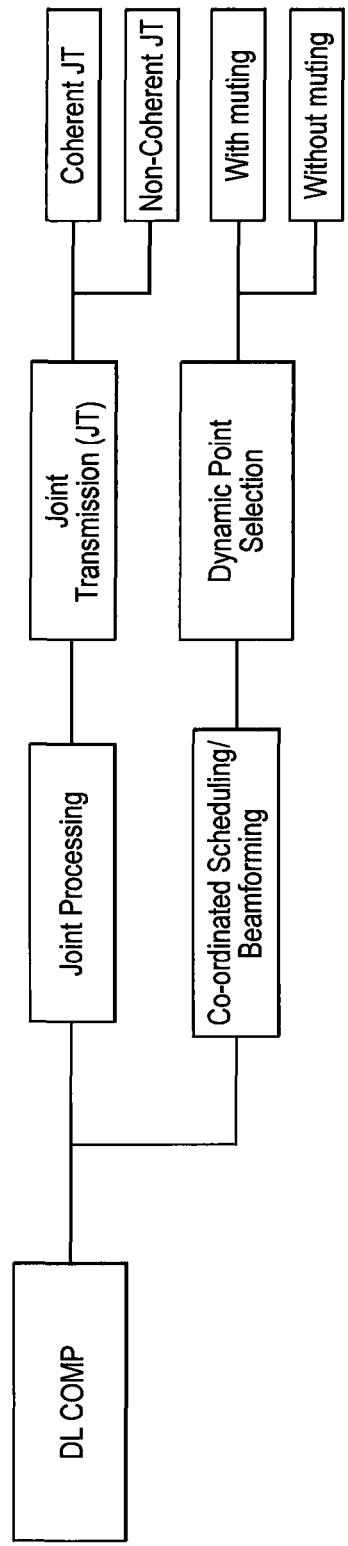
FIG. 3 diagrammatically illustrates different forms of Cooperative Multipoint transmission for use with the present invention.

Next, referring to FIG. 3, there are diagrammatically illustrated different forms of cooperative multipoint transmission for use with the present invention.

Location-Based Strategies for Multiple Access Nodes

The communication with multiple access points in a coordinated sense may be achieved in a number of different ways. Some of these will now be discussed using the example of the train embodiment detailed above with reference to FIG. 1. In a first use of this embodiment, a predicted location for the mobile terminal may configure the mobile terminal, the access nodes or both.

In this first use, a network entity of the network has a location predication engine. This is used to predict a location for each mobile terminal (which in this embodiment is a train) at a predetermined time. The predetermined time is a future time (or range of future times) and therefore the location is only a prediction. This mitigates the effect of high speed movement. The prediction is based on the location for the train (or other mobile terminal) at an earlier time, movement data for the train (also at an earlier time) or a combination of the two. Then, the predicted location can be used to configure the network, the mobile terminal or both in various ways to improve the quality of communication between the access nodes and the mobile terminal. A number of different ways of achieving this will be discussed below.

The location need not be limited to an exact location, but it may include, for example, a range of points or areas in space where the vehicular mobile terminal will be passing. The prediction would likely be carried out at an access node or centrally at the access network or core network of the cellular network.

The prediction may be based on current data (such as speed, location, direction, acceleration or similar), historical data (such as recorded data from previous days or the like) as well as on other data (such as current problem with the network, speed limit, accidents or others). Signalling across the can also be used to determine location, such as identifying location by cell or by RF-based position finding. The location may be based on one or more of: current location and/or movement data; historic location and/or movement data; time; and other analytics (timetabling information, data about recent journeys or similar).

Certain types of vehicle, such as trains and racing cars follow a specific path. Moreover, their speed along the path may be dictated by established factors. This may further assist in predicted the location of the mobile terminal. The speed can be provisioned by assistance from the vehicle, for example using its GPS, or from history enhanced with a statistical model, such as a Markov model.

The predicted position of the high speed vehicle could be confirmed by a simple signalling from the vehicle (such as beacon) that is received at an access node. For example, the network may decide that at a first time (t1), access nodes A, B and C will start cooperating as the vehicle is predicted to be in the range. However, before the co-operation is started, the network may first check whether the vehicle is actually in that range, for example by checking if node A (that is, the first node into which the vehicle will arrive within the coverage area) has received a beacon signal from the vehicle. If not, the network may then decide to keep using a previous set of co-operating nodes. This checking system could be extended in general to all the network to confirm the correctness of the prediction. In turns, this may reduce risk of loss of coverage, as well as reducing the power consumption of the system.

Figure 9:
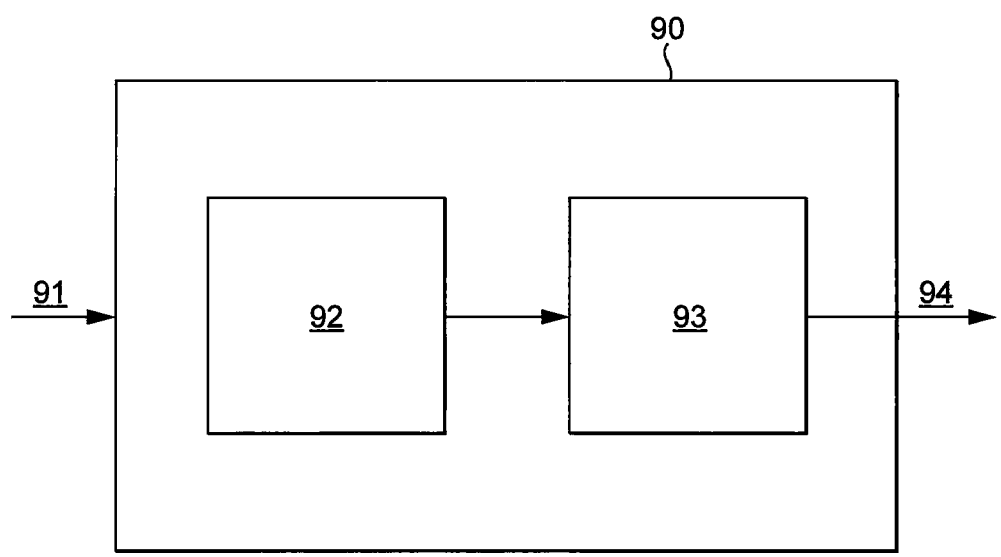
FIG. 9 depicts a schematic diagram of a network element in accordance with a second embodiment of the present invention.

Referring to FIG. 9, there is depicted a schematic diagram of a network element in accordance with a second embodiment of the present invention. This network element may represent a separate part of the system and can work together with the embodiment shown in FIG. 1 or with other embodiments. The network element 90 receives location and/or movement data 91 for a mobile terminal, along the lines discussed above. The network element 90 comprises: a location prediction engine 92; a configuration output 93; and a configuration signal 94.

The location prediction engine 92 predicts a location for the mobile terminal at a predetermined time, based on the received location and/or movement data 91. Then, it passes the predicted location to the configuration output 93, which determines a strategy for coordinated communication with the mobile terminal at the predetermined time, based on its predicted location. Then, the configuration output 93 provides a configuration signal 94, which configures two or more of the plurality of access nodes to effect the coordinated communication.

Whilst the network element 90 may be a specific network entity, it may also form a part of a network entity. Additionally or alternatively, the features of the network element 90 may be split between more than one network entity.

Whilst a number of location-based techniques using multiple access nodes will now be described as separate implementations, it will be appreciated that combinations are possible, which may result in additional synergies.

Determining Multiple Access Node Set Using Location

An approach for using the predicted location can allow the network to decide which set of access nodes (whether the sets are predetermined or adaptively created) will serve the vehicle mobile terminal. This need not require any feedback from the vehicle itself mobile terminal. Feedback may not be reliable at high speeds, limiting the usefulness of such techniques. The set of access nodes may be configured to operate cooperatively, for example using CoMP.

The set of access nodes can therefore be predetermined based on the predicted location, for example in 2 seconds time. This can be achieved without the mobile terminal suggesting the best transmission points. From the point of view of the moving vehicle, it is equivalent to having a seamless "moving" coordinated or co-operating network always following it.

The set of the plurality of nodes may be pre-determined or adaptively chosen based on network parameters. The system may further include an element to enable or activate the determined set of nodes for communication with the vehicle. The activation may occur at a predicted time. The activation may be dependent upon determining that the vehicle is actually located at the predicted location, as discussed above.

Resource Allocation for Multiple Terminals Using Location

The predicted location for the mobile terminal can also be used to improve resource allocation. Resource for the mobile terminal can be pre-assigned at one or each access node. Additionally or alternatively resources at an access node can be partitioned between multiple mobile terminals based on their predicted location. This may be possible as the base station controller (or equivalent) can predict how many mobile terminals are likely to be required to be served.

For example, 50% of the resources can be pre-allocated to each of two mobile terminals (such as racing cars during a race). However, if can be determined only one mobile terminal needs to be served then all the resource can be allocated to this. This aspect of resource pre-determination of allocation will reduce resource re-allocation and congestion.

For a high speed train scenario, such a problem may occur when two trains pass each other and desire service from the same cell. If this scenario can be predicted accurately, the resource can be better managed and this may reduce interruption to users. Capacity may possibly be increased in such scenarios as well.

The resources that are allocated may include transmission resources, reception resources and other access node or channel resources. For example, the resource allocation may comprise one or more of: a bandwidth allocation (for example in OFDM-based technologies); transmission power allocation; a duty cycle allocation (such as how often transmissions are scheduled to occur); and a power supply allocation (for instance, how much power to provide to the transmitter or receiver).

Energy consumption, particularly of RF components in the network is significant. In addition to energy consumption, RF transmission causes interference. Resource allocation to reduce or minimise energy consumption may be of particular benefit.

Prediction of the mobile terminal location (using the techniques discussed above) may be useful in determining how to conserve energy, especially for access nodes along a train track link, which may be used infrequently and which may be closely spaced to ensure connectivity. Possible ways to achieve this include the following.

a) An intelligent Operation and Maintenance (O&M) system could dynamically power the access nodes in synchronisation with the schedule of mobile terminals (such as trains).

b) Each access node could operate with a respective (possibly different) duty cycle.

c) Changing the cell size and switching off one or more cells is a further possibility. Increasing cell density increases the throughput that can be offered per user. By increasing the transmission power of a cell, its range (cell size) may be increased, allowing fewer cells to be active. This could be performed dependent on the expected traffic (for example, there may be quieter times in terms of traffic after a certain point of the day or night, such as midnight).

d) The coverage layer and capacity layer can be dynamically controlled. For example, the capacity layer may switched on only when the mobile terminal (train or similar) is to be served. This can be indicated using coverage layer.

Beam Steering for Multiple Access Nodes

Uplink and downlink 3D beams may be steered towards appropriate receive antennas as the Angle of Departure (AOD) may be determined, especially when the mobile terminals is at constant speed. Thus, the predicted location of the mobile terminal may be used to affect the beam steering at the access nodes. This could be seen as a virtual bean steering, in which a beam "follows" the moving vehicle along its path.

Separated Uplink and Downlink for Multiple Access Nodes

Figure 4:
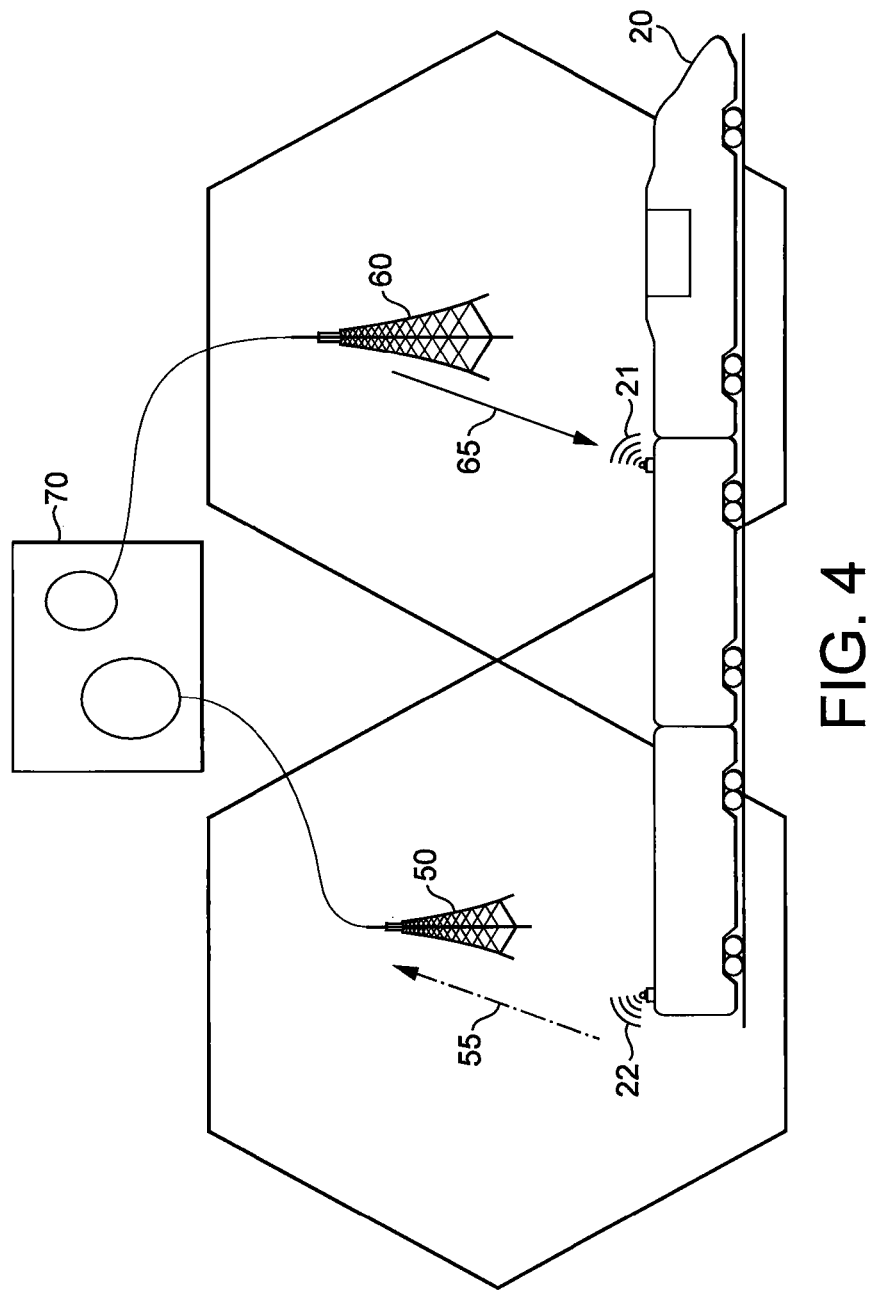
FIG. 4 shows a schematic diagram relating to the embodiment of FIG. 1 in a second use.

Referring to FIG. 4, there is shown a schematic diagram relating to the embodiment of FIG. 1 in a second use. Here, the train 20 has a front modem 21 and a rear modem 22. The rear modem 22 is communicating with a first access node (within a first cell) 50 via a first interface 55. The front modem 21 is communicating with a second access node 60 (within a second cell) via a second interface 65. The first access node 50 and second access node 60 use backhaul links 70 to interface with the network and each other. The coverage of the first and second cells is schematically drawn as hexagonal shapes. Although these are not drawn as tessellating shapes, no significance should be attached to this.

The first interface 55 is an uplink only interface, whilst the second interface 65 is a downlink only interface. In preference, this uses time division duplex (TDD) configuration only. In practice, a TDD mobile terminal would not simultaneously transmit and receive. With widely separated antennas, especially as would be the case of a train, it is possible to use all of the sub-frames of TDD simultaneously for uplink and downlink, in the same way as a frequency division duplex (FDD) system would use. This is only the case if the transmission and reception are coordinated from the train mobile terminal 20 to different access nodes, as is shown in FIG. 4.

Exploiting Spatial Separation

Network traffic growth trend is less asymmetric, with an increase in uplink data-heavy applications such as uploading of photos or videos, sharing files or similar. These require high data rate in uplink. Single User MIMO (Multiple Input Multiple Output) is a technique where multiple streams of data are sent using the same time and frequency resource. In theory, a 4-stream MIMO, requiring a minimum of four antennas at each of the transmitter and receiver, will quadruple the data rate serviced compared to a single stream SISO (Single Input Single Output) or MISO (Multiple Input Single Output) terminal. Whilst closely-spaced antennas provide beam-forming gains, they are not suitable for SU-MIMO where wide spacing of antennas are beneficial. If each antenna element can be separated from its nearest element by around 4 to 10 times the wavelength the signal, each multipath can be kept independent. For 800 MHz, the wavelength is 0.375 meters (14.75 inch), such that 10 times the wavelength is 3.75 meters. Handheld mobile terminals are limited by the form factor, but antenna spacing is less of a constraint on a train. Thus, distributing the antennas along the train may increase spatial diversity. With a typical coach length of approx. 23 meters, at least two mobile terminals can have its each of the 4 antennas separated with good separation.

Figure 5:
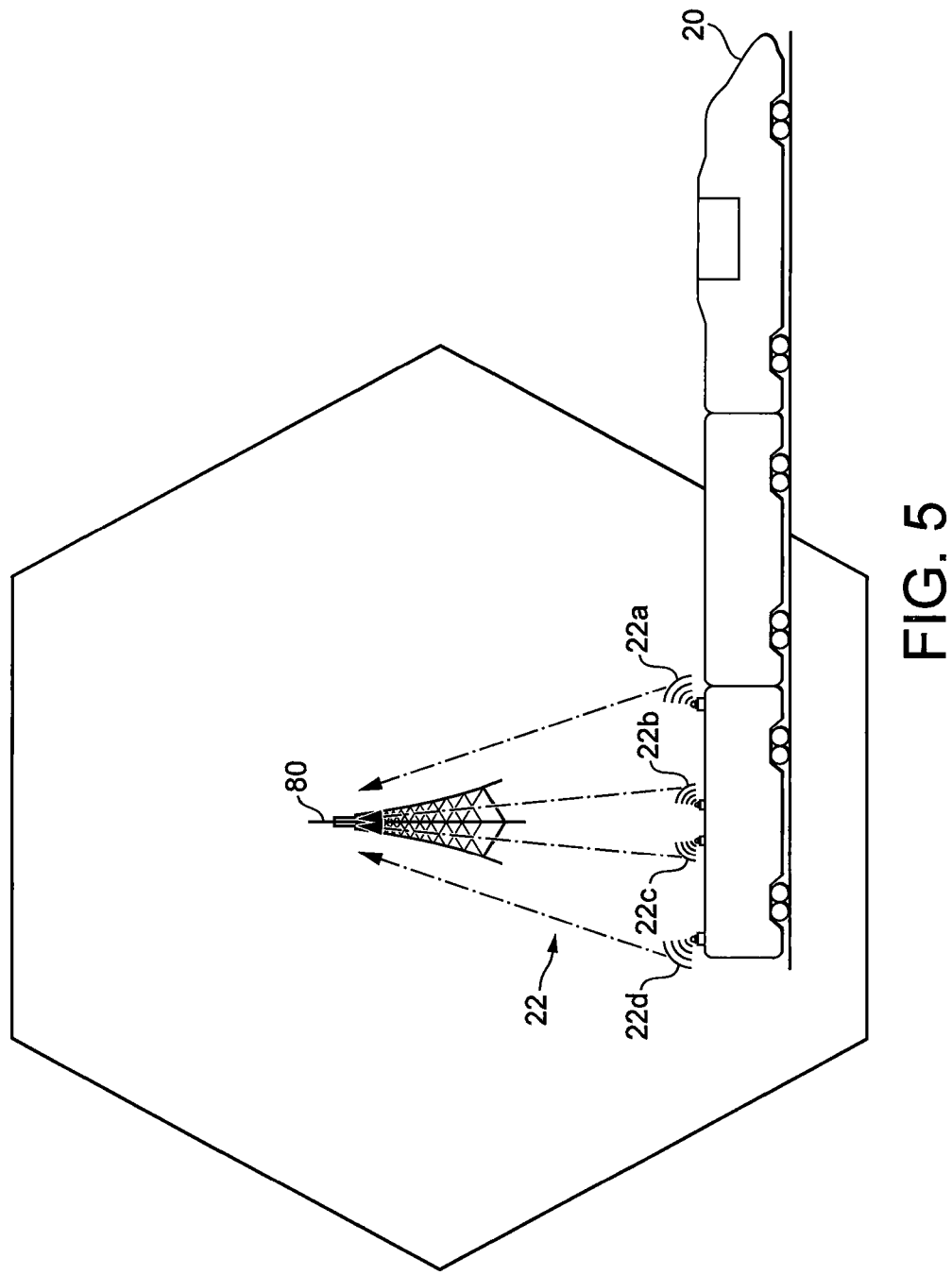
FIG. 5 illustrates a schematic diagram relating to the embodiment of FIG. 1 in a third use.

Referring to FIG. 5, there is illustrated a schematic diagram relating to the embodiment of FIG. 1 in a third use, along these lines. The train 20 has a rear communications system 22 comprising four antennas: a first antenna 22a; a second antenna 22b; a third antenna 22c; and a fourth antenna 22d. The four antennas are all coupled to the same modem for SU-MIMO to an access node 80.

This type of approach can have significant benefits for a train-based mobile terminal. Unlike a typical handheld unit, a wireless modem for train communication is not constrained by power. Beam tracking for beam-forming may be difficult to achieve at very high speeds, so large antenna beam-width and space/frequency diversity can be exploited to increase capacity. For OFDM-based Radio Access Technologies, such as used on LTE, large sub-carrier spacing may reduce inter-subcarrier interference at high Doppler shifts.

Improving Aggregate Throughput

A second approach for configuring the mobile terminal of FIG. 1, the access nodes or both may use independent control of the front modem 21 and rear modem 22 of the train 20. Since the front modem 21 and rear modem 22 will be used together to provide an overall service across the train, their operation can be jointly controlled and although the two communication systems may work separately, their joint control may provide improvements. In particular, the aggregate data rate across the communication links between each of the modems and one or more of the access nodes can be controlled, increased or optimised (maximised).

There are various ways of implementing such a system, some of which will not be discussed below. Although these will again be described with reference to the embodiment of FIG. 1, it will be understood that any mobile terminal with multiple communications systems may equivalent be employed. Also, it will be appreciated that these different techniques are described (and may be implemented) independently. Nonetheless, combinations of the techniques can be employed and further synergies may be possible.

Handover Control for Improved Aggregate Throughput

Figure 6:
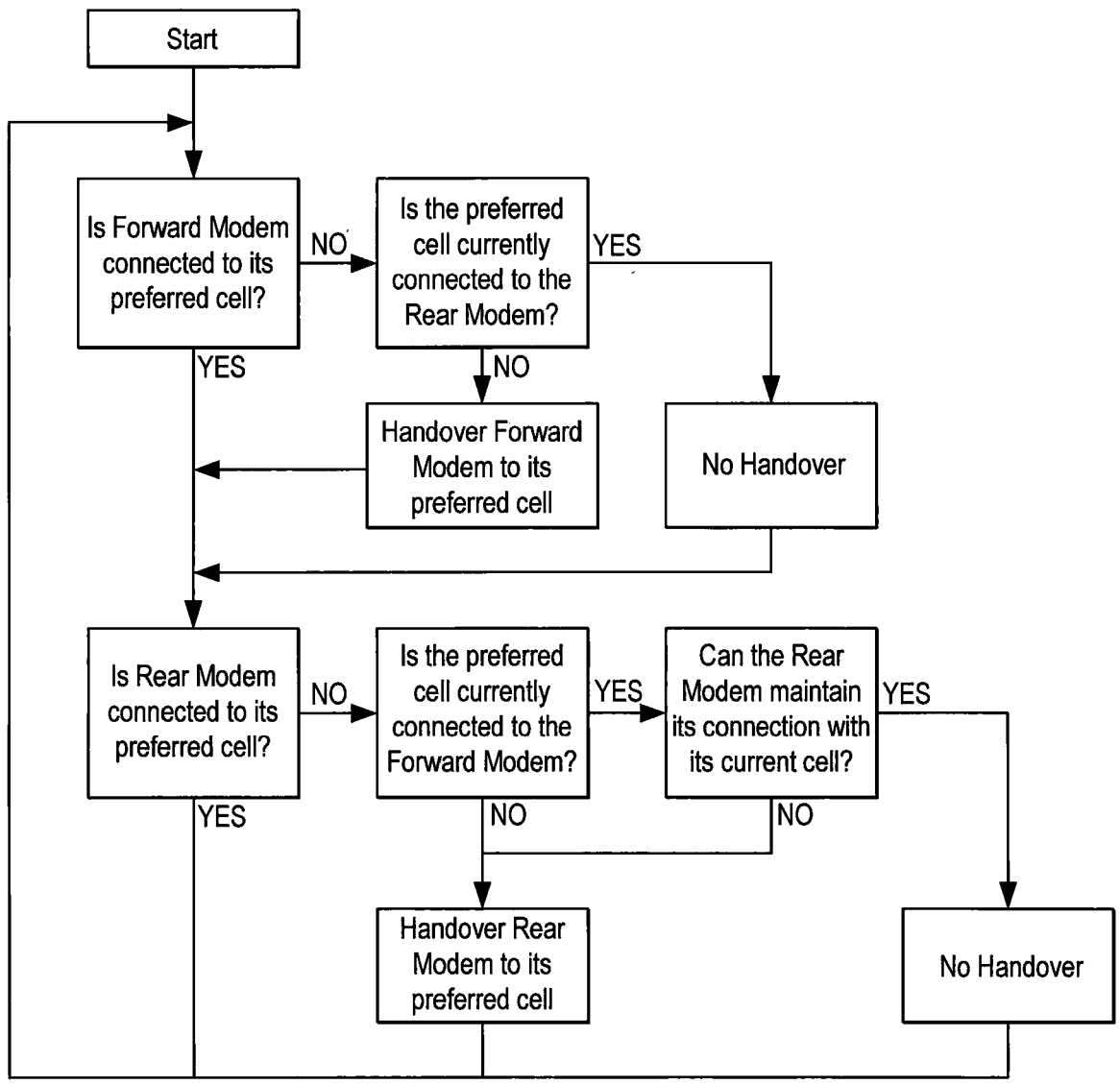
FIG. 6 is a flowchart for a first mode of operation of the embodiment of FIG. 1.

Referring next to FIG. 6, there is shown a flowchart for a first mode of operation for the embodiment of FIG. 1. In this mode, the access node to service each of the multiple communications systems is selected to improve the aggregate throughput. Although FIG. 6 shows a detailed algorithm, an outline of the reasoning behind this algorithm will be discussed below.

In particular, it may not make sense for the communications systems at both ends of the train to be connected to the same access node, as this can result in the access node having to split its capacity between the two ends of the train. As the received signal quality is likely to be better at one or other end of the train, it therefore makes sense for a given access node to serve only the end of the train where the signal quality is higher. Generally, this will be the end closest to the access point.

Hence, the two ends of the train should normally be served by different access points. When the train is in between sites, then the situation is straightforward; (with reference to FIG. 1) the forward end 21 of the train 20 is served by the access point it is heading towards (rear facing sector of the mast ahead of the train) and the rear end 22 of the train 20 is served by the access point that the train is moving away from (forward facing sector of the mast behind the train). This situation should be maintained even if the modem at the rear of the train would prefer to handover to the same access point as is being used by the front of the train as the train moves away from the rear mast and towards the forward mast. In other words, we should force one to remain with the "wrong" eNodeB (that is, the one from which the transceiver will try to move away). If connectivity is lost by the rear modem to the forward facing sector of the last mast, however, the rear modem should then connect to the rear facing sector of the forward mast. This will result in a period when both ends of the train are connected to the same access point. This situation may be handled by the scheduler, as discussed below.

As the front of the train passes a mast, the normal handover mechanism will force the modem at the front of the train to change its connectivity from the rear facing sector to the forward facing sector of that mast. Alternatively, the modem at the front of the train can be forced to handover at a given geographical location corresponding to the location of the mast. There are various ways in which a forced handover can be achieved. For example, the modem can be informed of its location by a GPS receiver, and the locations of each mast along the route could be stored in an on-board database. When the front modem hands over, the modem at the rear of the train can then immediately handover to the rear facing sector if this has not already happened. Sometime afterwards (usually a short period), the rear modem will pass the mast, and prefer to connect to the forward facing sector. This handover should be executed, and the front modem should be forced to handover to the rear facing sector of the forward mast as soon as this is detected. In this way, the train will be continuously connected to at least one good sector. Again, there may be a period of time when both modems are connected to the same access point and, again, this situation is handled by the scheduler as discussed below.

Whilst the above is discussed with reference to a train, it will be appreciated that it may equally be applied to other vehicular-based mobile terminals with more than one communications system. Equally, it may be applied to vehicular-based mobile terminals with more than two communications systems.

Power Control for Improved Aggregate Throughput

Power control is used to maximise throughput to the train, particularly when each modem (communication system) is connected to a different access point. Joint control of the communications systems can be used to effect this.

The throughput of a given link is a function of the SINR of that link. However, this function can be different for different terminal implementations. Knowing the SINR for a given link does not necessarily mean that the throughput on that link can be accurately estimated.

This problem was foreseen for systems that use adaptive modulation and coding (such as LTE). Hence, such systems may require that the terminals provide an estimate of the current quality of the link (known in LTE as the Channel Quality Indicator, or CQI), so that the base-station can adjust the allocated modulation and coding scheme accordingly. As the used modulation and coding scheme may determine the throughput of the link, the CQI may then be considered as a measure of the current throughput that can be expected over a link. A similar mechanism can be used for the uplink but, as this measure is only used internally within the access point, it is not subject to standardisation. It will be understood that link quality in other systems may equivalently be used as a measure of throughput.

Knowing the current CQIs of the two links, the system may thus estimate the combined throughput available to the train. The next step is to estimate how a change in the relative transmit powers of the two links will affect the CQIs and hence available throughputs of the links. As noted above, the CQI is not a simple function of the SINR. However, it is possible for the mapping from SINR to CQI to be derived for a given terminal, either by measuring it or from a manufacturer's specification. As it is likely that a limited set or, indeed, only a single terminal type may be used (especially for a train-based system), this is a practical proposition.

Figure 7:
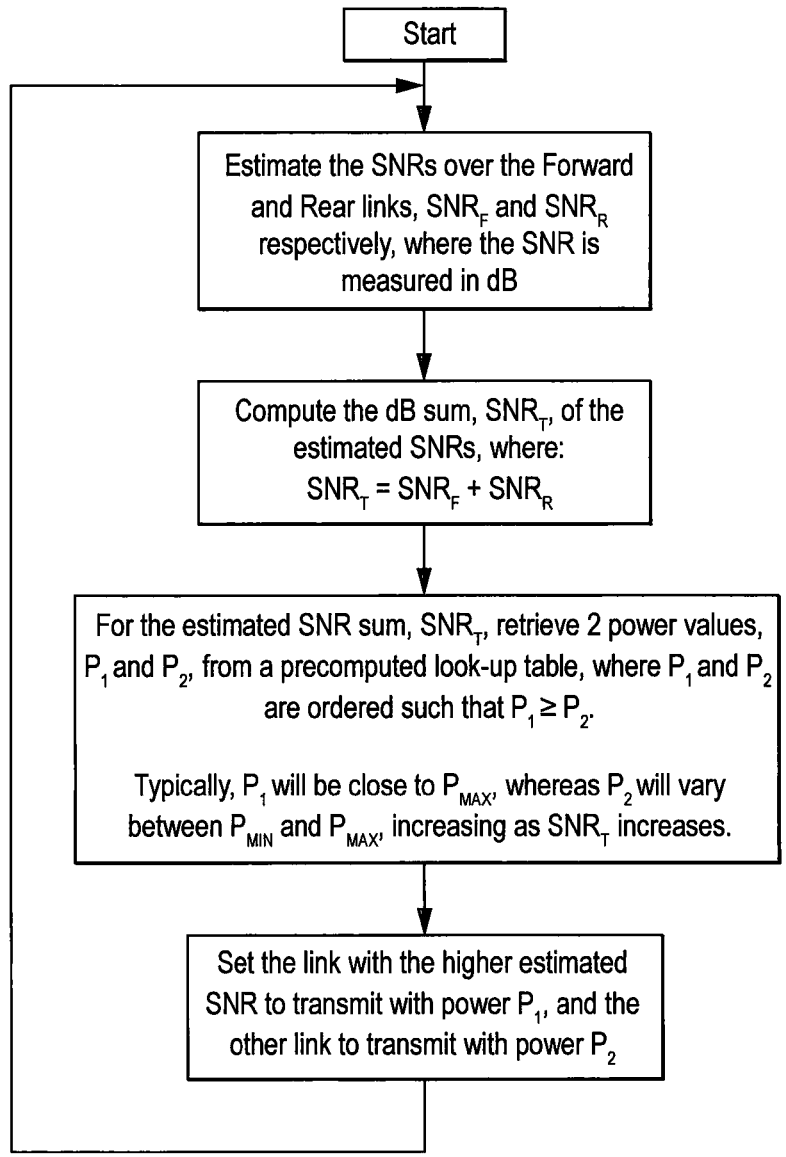
FIG. 7 is a flowchart for a second mode of operation of the embodiment of FIG. 1.

On this basis, the system can estimate how a given change in SINR will affect both the CQI, and hence the throughput of a link. This estimate may be improved if there is no other co-channel interference affecting the links (perhaps because the spectrum used is dedicated to the application, or is not otherwise used in the area around railway lines). The only other source of interference in that case will be the receiver noise floor. It is expected that the signal levels will normally be much higher than the receiver noise floor and it can be assumed, to a good approximation, that the SINR on a link will simply be the ratio of the received powers of the wanted link and interfering link respectively. Referring to FIG. 7, there is shown a flowchart for a second mode of operation of the embodiment of FIG. 1, along the lines discussed above.

Using this approach, the system will know that a given x dB rise in transmit power on a given link will result in the SINR for that link rising by x dB and the SINR for the other link falling by x dB. By mapping the resulting SINRs to CQIs and hence throughputs, the system can alter the transmit powers for both links to maximise throughputs. This method can be used on both the uplink and downlink, as these are separately power controlled.

In the event that the noise floor or other interference on the links is significant compared to the received link powers, then the change will be less than predicted by the system. In this case, the system can continue to adapt the transmit powers according to the updated CQIs reported following the previous power update. As the system will anyway continually update the transmit powers (because the train is continually moving), this is not a significant issue.

Again, the above is discussed with reference to a train, but it will be appreciated that it may equally be applied to other vehicular-based mobile terminals with more than one communications system. Equally, it may be applied to vehicular-based mobile terminals with more than two communications systems.

Transmission Scheduling for Improved Aggregate Throughput

Further improvements in aggregate throughput may be achieved by appropriate scheduling of transmissions from the access node (or nodes) to the communications systems, to the access node (or nodes) from the communications systems or both. Once more, this is especially beneficial for train-based mobile terminals and such an approach will be discussed below, but it may be applicable to other vehicular-based mobile terminals.

On occasions when both ends of the train are connected to the same access point, the scheduler at that access point can ensure maximum throughput by the use of frequency selective scheduling. The sector may receive CQI reports from each communication system, and use these to decide which resources to allocate to the front modem, and which to the rear. This scheduling strategy is known as "Max C/I" and can be appropriate in this case, as the throughput from both modems is aggregated, and hence fairness mechanisms may not be required.

The exception to this may be when more than one train is connected to a given sector. In that case, the scheduler can apply a fair scheduling algorithm between trains (for example, proportional fair), but a Max C/I algorithm between both modems on the same train.

Figure 8:
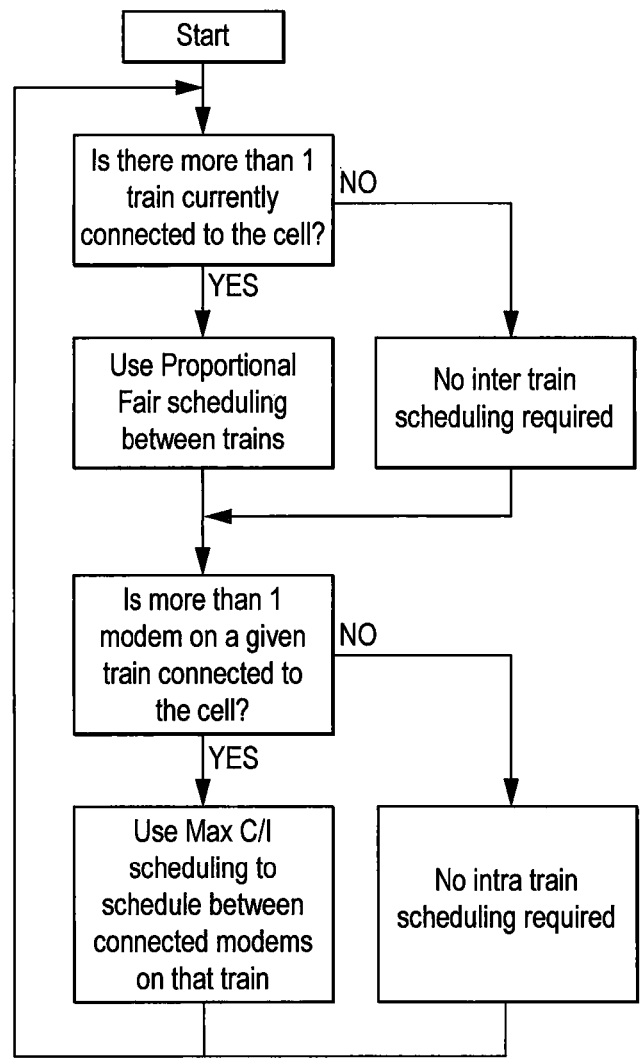
FIG. 8 is a flowchart for a third mode of operation of the embodiment of FIG. 1.

Referring to FIG. 8, there is shown a flowchart for a third mode of operation of the embodiment of FIG. 1 The scheduler strategy selection algorithm can thus be summarised as shown in this diagram.

Applications

Figure 10:
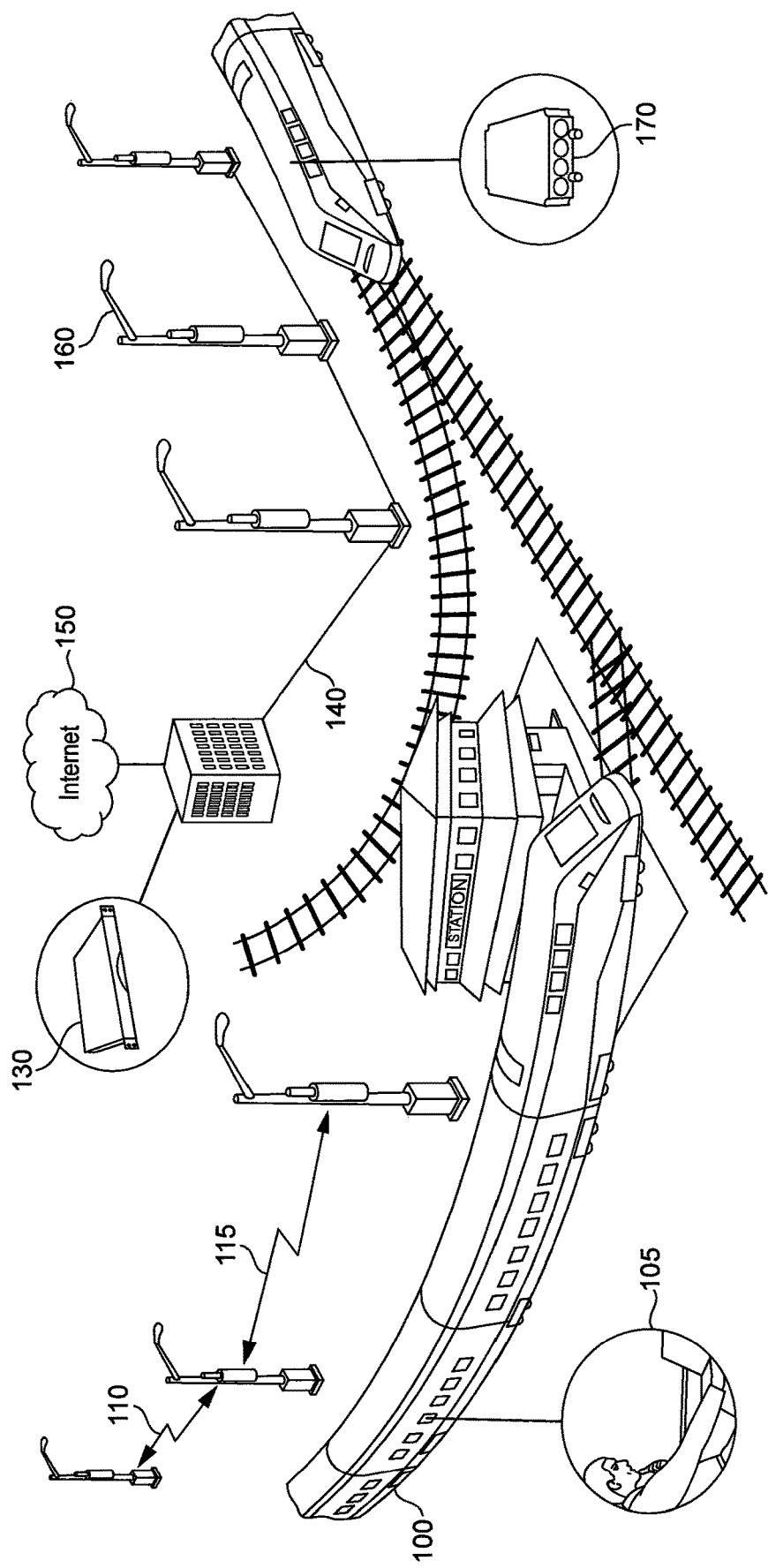
FIG. 10 shows a first scenario for operation of the present invention in use.

As discussed above, the various features and strategies may be implemented in a variety of different applications and with a range of embodiments. However, a primary application is for a train-based system. Referring now to FIG. 10, there is shown a first scenario for operation of the present invention in use.

The train 100 provides passenger on-board Internet access 105. This is achieved using masts 110, which are 4G LTE or WiMAX pico-cell base stations with self-provisioning relay capabilities. Wireless IP backhaul links 115 may also be used. Further base stations 160 have optical fibre-based backhaul and are shown servicing another train.

The backhaul links are coupled to an operational control centre 140, which houses a server 130. This may be used for security control, traffic control or both. This also acts as the gateway between the cellular network and the Internet 150.

Each train is provided with more than one Mobile Radio Terminal (MRTe) 170 (although only one is shown in FIG. 10). These act as a communications system between the train and the network and provide the on-board Wireless LAN server to passengers 105.

Figure 11:
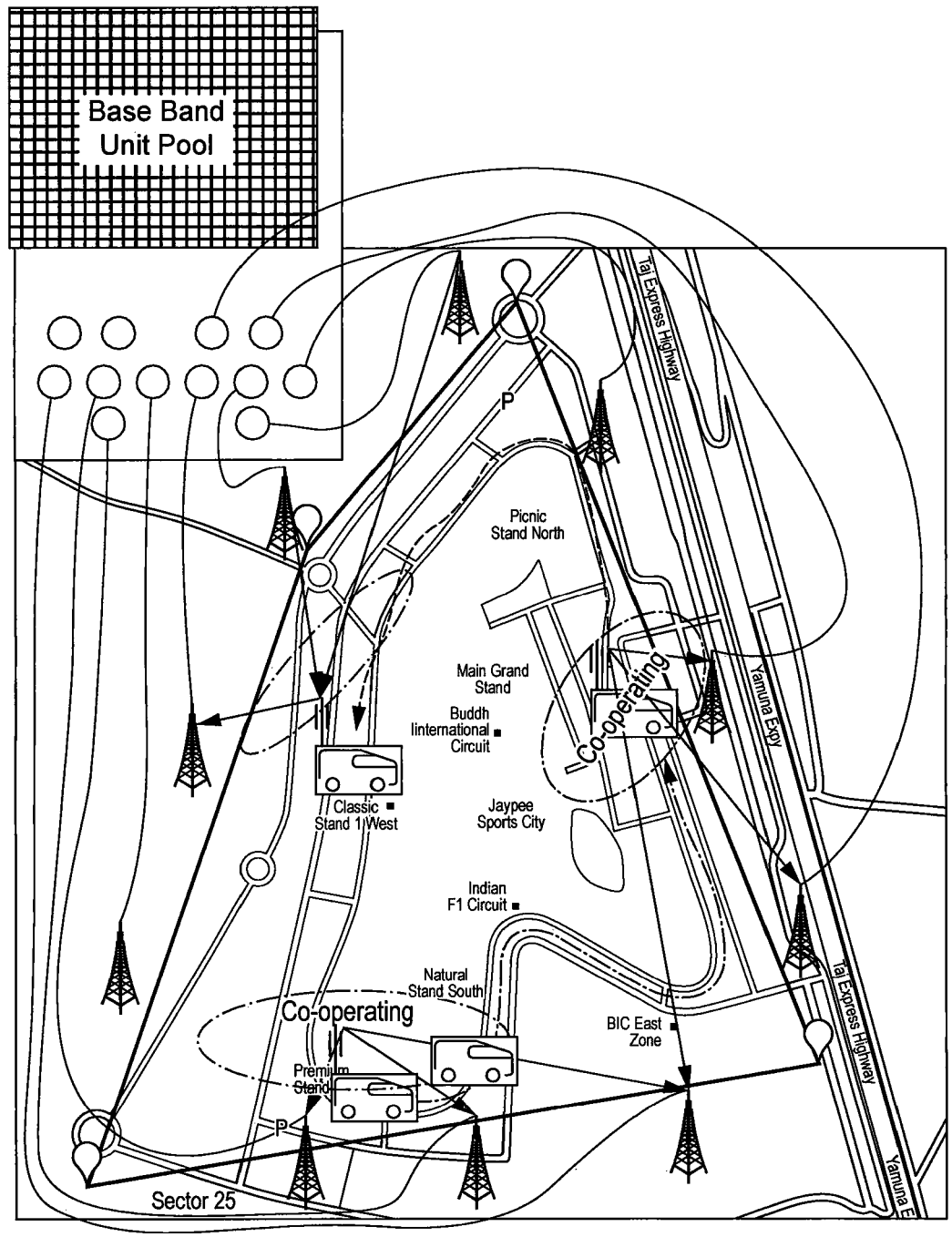
FIG. 11 shows a second scenario for operation of the present invention in use.

The invention may also be applied to racing cars. Referring to FIG. 11, there is shown a second scenario for operation of the present invention in use. Access node base stations are deployed along the perimeter of the race track. A typical race circuit can have a coverage area in excess of 3 km with sustained throughput of average 50 Mbps per car. Cooperating sets of base stations are shown for communicating with the multiple racing cars.

Variations

Whilst specific embodiments have been described, the skilled person will conceive of various modifications, substitutions and alternatives. Many of these have been discussed above with reference to particular features or strategies. Combinations of features or strategies are also possible, even though not explicitly disclosed.

The invention claimed is:

1. A system for performing configuration within a cellular communications network to service high velocity mobile terminals, the cellular communications network comprising a plurality of geographically distributed access nodes arranged for communication with mobile terminals, the system comprising:
  a network entity of the cellular communication network, the network entity including one or more processors for executing program instructions comprising:
    a location predictor that predicts a location for a first mobile terminal at a predetermined time; and
    a configuration controller that configures two or more access nodes of the plurality of geographically distributed access nodes of the cellular communications network for cooperative multipoint communication with the first mobile terminal at the predetermined time, based on the predicted location for the first mobile terminal;
  wherein the first mobile terminal comprises a plurality of commonly controlled communications systems associated with and providing service across a vehicle, with the respective communications systems of the first mobile terminal positioned at different locations about the vehicle, and wherein the configuration controller operates to configure the two or more access nodes for cooperative communication with each of the communications systems of the first mobile terminal at the predetermined time, based on the predicted location for the first mobile terminal;
  wherein, at the predetermined time, a first communications system of the plurality of communications systems is in communication with a first access node of the two or more access nodes and a second communications system of the plurality of communications systems is in communication with a second access node of the two or more access nodes; and
  wherein the configuration controller operates to place, at a time subsequent to the predetermined time, the first communications system of the plurality of communications systems in communication with the second node of the two or more access nodes.

2. The system of claim 1, wherein the network entity further includes an access node selector that selects the two or more access nodes, based on the predicted location for the first mobile terminal.

3. The system of claim 1, wherein the network entity further includes a resource allocation coordinator that determines resource allocation of the two or more access nodes for cooperative communication with the first mobile terminal at the predetermined time, based on the predicted location for the first mobile terminal; and wherein the configuration controller operates to configure the determined resource allocation of the two or more access nodes.

4. The system of claim 3, wherein the resource allocation determined for the two or more access nodes comprises one or more of: a bandwidth allocation; a transmission power allocation; a duty cycle allocation; and a power supply allocation.

5. The system of claim 3, wherein the location predictor further operates to predict a location for a second mobile terminal at the predetermined time; and wherein the resource allocation coordinator further operates to determine resource allocation of the two or more access nodes for cooperative communication with the first mobile terminal and with the second mobile terminal at the predetermined time, based on the predicted location for the first mobile terminal and the predicted location for the second mobile terminal.

6. The system of claim 3, wherein the resource allocation coordinator further operates to establish activation characteristics for the plurality of access nodes, based on the predicted location for the first mobile terminal; and wherein the configuration controller operates to activate and/or deactivate at least part of the two or more access nodes based on the established activation characteristics.

7. The system of claim 1, wherein the network entity further includes an antenna controller that determines antenna beam steering configurations of the two or more access nodes for cooperative communication with the first mobile terminal at the predetermined time, based on the predicted location for the first mobile terminal; and wherein the configuration controller operates to set the determined antenna beam steering configurations of the two or more access nodes.

8. The system of claim 1, wherein at least one of the first communications system and the second communications system comprises a modem configured to be placed in communication with multiple access nodes of the plurality of geographically distributed access nodes at the same time.

9. The system of claim 1, wherein the configuration controller operates to place both the first communications system of the plurality of communications systems and the second communications system of the plurality of communications systems in communication with a single node of the plurality of geographically distributed access nodes at the time subsequent to the predetermined time.

10. The system of claim 1, wherein the location predictor operates to predict a location for the first mobile terminal at the predetermined time, based on one or more of: current location data for the first mobile terminal; current movement data for the first mobile terminal; a location for the first mobile terminal at a time before the predetermined time; a speed for the first mobile terminal at the time before the predetermined time; a direction for the first mobile terminal at the time before the predetermined time; and a current time.

11. The system of claim 1, wherein the location predictor operates to predict a location for the first mobile terminal at the predetermined time, based on a predetermined travel route for the first mobile terminal.

12. The system of claim 1, wherein the cellular communications network comprises one or more of: a wireless Local Area Network; a wireless Wide Area Network; and a mobile telecommunications network.

13. A method for configuring a cellular communications network that comprises a plurality of geographically distributed access nodes arranged for communication with mobile terminals, the method comprising:
  predicting, via a location predictor of a network entity of the cellular communication network, wherein the network entity includes one or more processors for executing program instructions, a location for a first mobile terminal at a predetermined time, wherein the first mobile terminal comprises a plurality of commonly controlled communications systems associated with and providing service across a vehicle, with the respective communications systems of the first mobile terminal positioned at different locations about the vehicle;
  configuring, via a configuration controller of the network entity, two or more of the plurality of access nodes of the cellular communications network for cooperative multipoint communication with each of the communications systems of the first mobile terminal at the predetermined time, based on the predicted location for the first mobile terminal, such that, at the predetermined time, a first communications system of the plurality of communications systems is in communication with a first access node of the two or more access nodes and a second communications system of the plurality of communications systems is in communication with a second access node of the two or more access nodes; and placing, via the configuration controller, the first communications system of the plurality of communications systems in communication with the second access node of the two or more access nodes, subsequent to the predetermined time.

14. A non-transitory computer-readable storage medium comprising computer-executable program instructions stored thereon that are arranged to perform the method of claim 13 when executed by a processor.

* * * * *